Patented Sept. 7, 1948

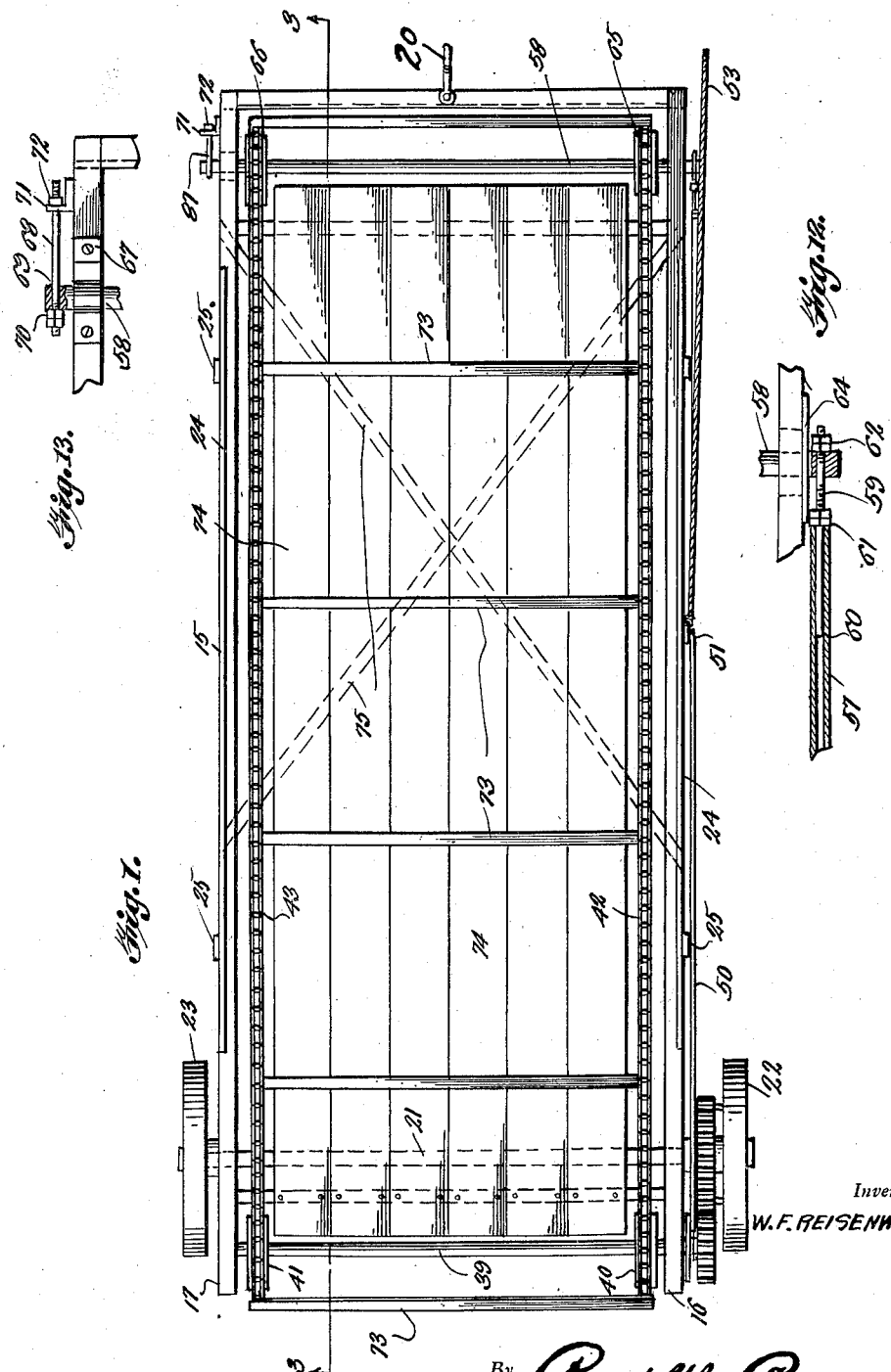

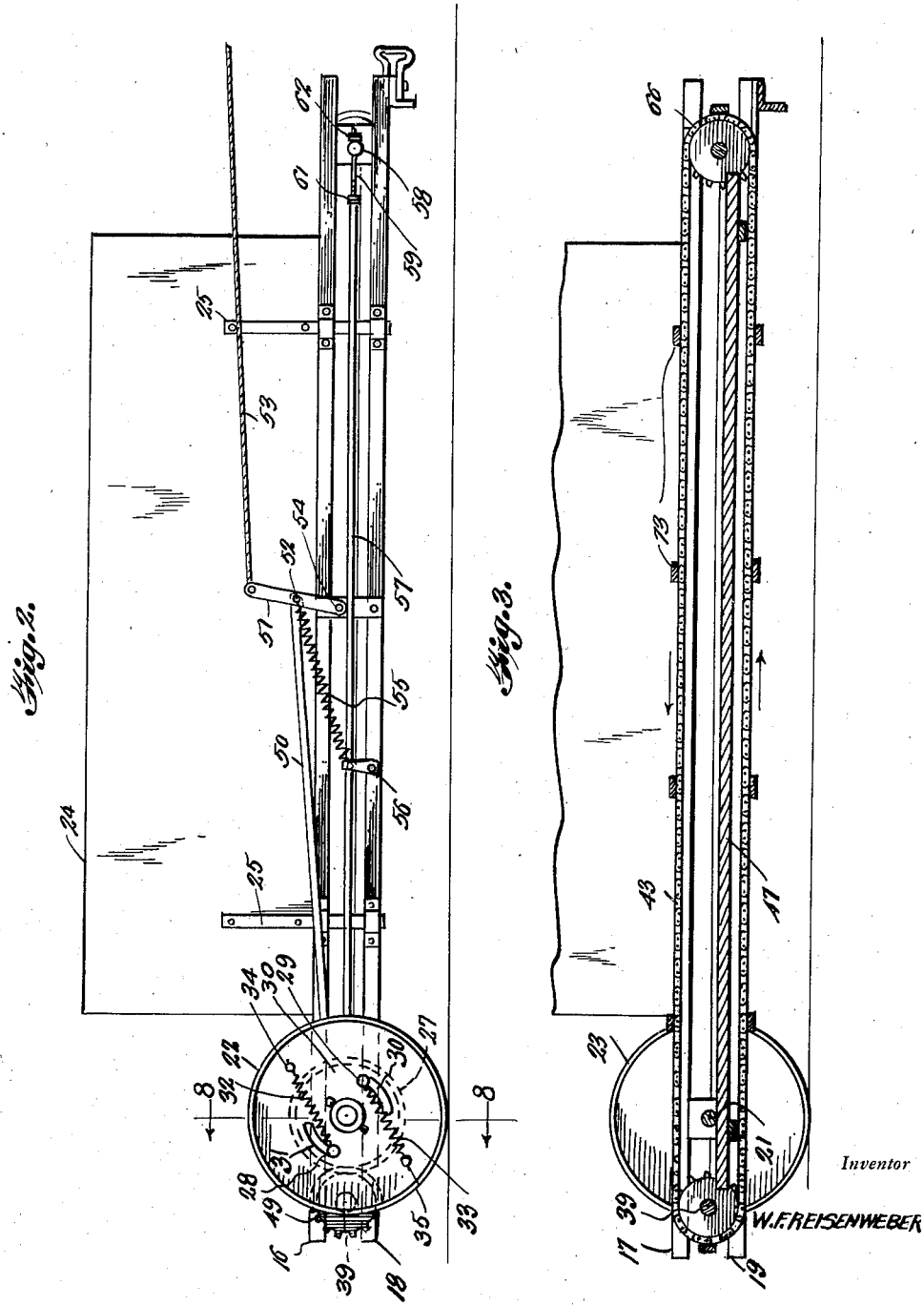

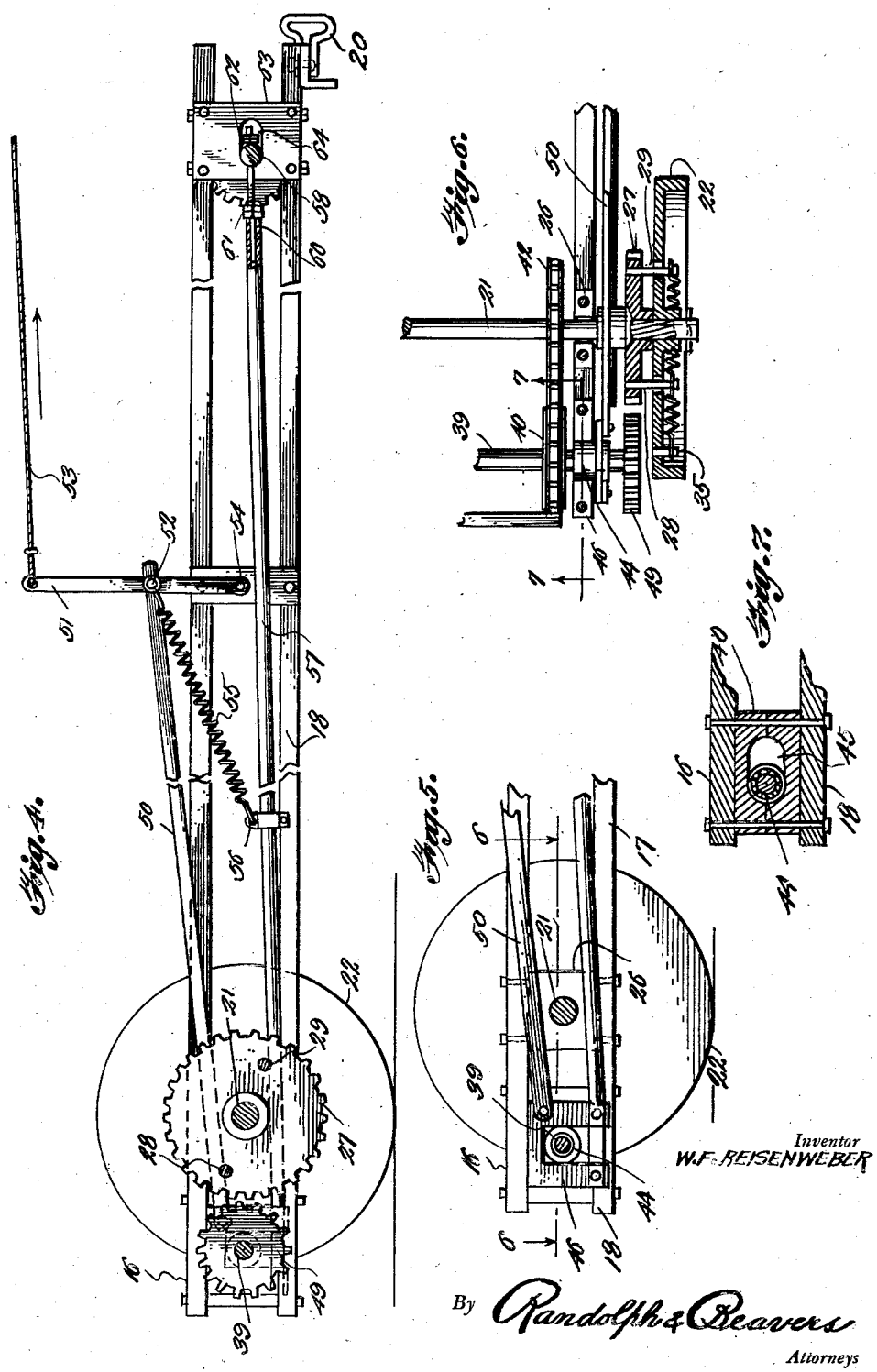

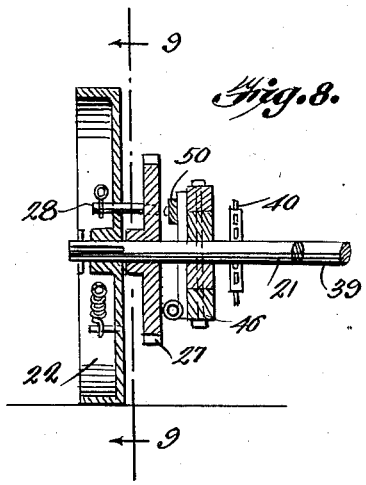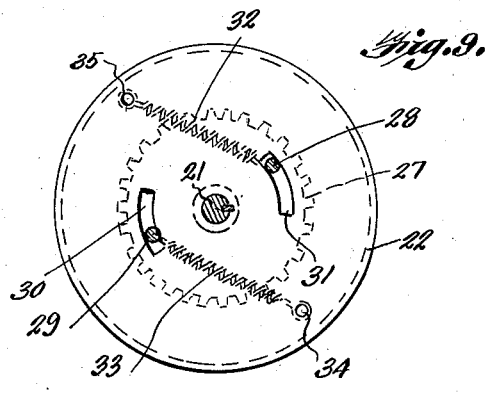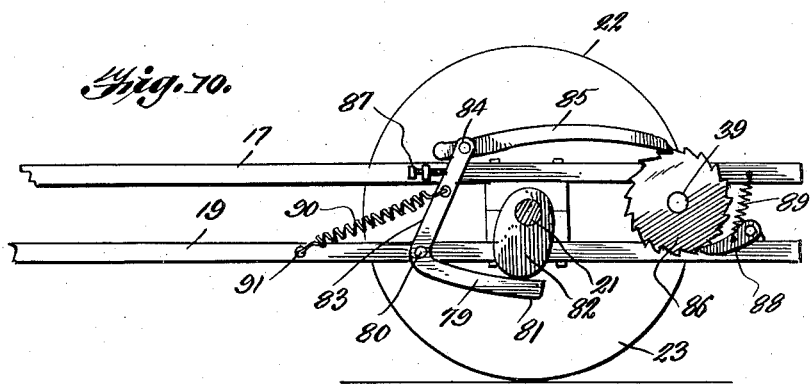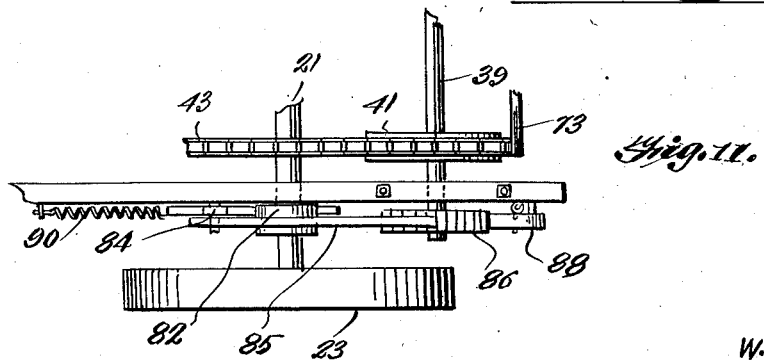

2,448,737

UNITED STATES PATENT OFFICE 2,448,737

COMBINE HARVESTER AND STRAW BUNCHER

William F. Reisenweber, Newark, S. Dak.

Application October 18, 1945, Serial No. 622,974

3 Claims. (Cl. 214—83.36)

This invention relates to harvester trailers for bunching straw and chaff.

An object of the invention is to provide a buncher that will neatly pile the bunches and at the same time produce larger bunches than other machines now commonly in use.

Another object is to provide a machine of this type that will be positive in operation and having all of its mechanism driven by its own traction alone, no power, other than the pulling being furnished by the leading vehicle.

Another object is the provision of a machine that will dump the bunches at the pleasure of the driver and dump them so that they will be in compact bunches and not spread along the path of the vehicle.

Another object is the elemination of the usual cumbersome hood found on the conventional bunchers.

Still another object is the provision of such a machine that at all times and under all conditions will remain close to the ground, thus providing a maximum capacity thereof.

And a further object is to provide a trailer buncher of extremely simple design and one that may be manufactured cheaply and operated by a most inexperienced hand.

These and other objects will become apparent by a reading of the specification taken in connection with the accompanying drawings, in which:

Figure 1 is a top plan view of the machine as it would appear ready for operation, Figure 2 is a side elevation illustrating the dumping mechanism in operative position, Figure 3 is an elevational view, partly in section, taken on the line 3—3 of Fig. 1.

Figure 4 is a side elevation, similar to Fig. 2, illustrating the parts in inoperative position, with outer parts removed for clearness, Figure 5 illustrates the details for meshing and unmeshing the gears, Figure 6 is a detail sectional view taken on the line 6—6 of Fig. 5, Figure 7 is a detail view taken on the line 7—7 of Fig. 6, Figure 8 is a sectional view taken on the line 8—8 of Fig. 2, Figure 9 is a sectional view taken on the line 9—9 of Fig. 8, Figure 10 illustrates the mechanism for adjustably moving the conveyor chains between windrows, Figure 11 is a top plan view showing the adjustable means, of Fig. 10, in its relation to other parts, Figure 12 shows the adjustment on the right hand side for maintaining the chains at proper tension and Figure 13 is the adjustment on the left hand side for the same purpose as that of Fig. 12.

Referring now to the drawings, the numeral 15 indicates the buncher or windrower generally which is provided with the upper longitudinal frame members 16 and 17 and similar lower frame members 18 and 19. At the forward end of the frame is arranged any conventional type of hitching means such as the clevis 20.

Located at the rear of the frame is a shaft 21 which is journaled in each side thereof and has traction wheels 22 and 23 rigidly mounted on the ends thereof. Similar, or any other desirable type wheels are positioned at the front but are not shown in the drawings.

Conventional side boards 24 are located on each side and are supported by the uprights 25.

At one end of a rockable saft 21 and on the outside of the shaft journal 26, is loosely mounted a gear wheel 27 from which extends any desirable number of studs 28 and 29 which protrude through the curved slots 30 and 31 in the wheel 22. The outer ends of the studs have attached thereto one end of the springs 32 and 33 the other ends of the springs being connected to the pins 34 and 35 and these pins are rigid with the wheel 22.

To the rear of the shaft 21 is another transverse rockable shaft 39 which rigidly carries sprocket wheels 40 and 41 thereon and around which conveyor chains 42 and 43 are arranged and which will move said chains when they are rotated. The shaft 39 is also journaled in the frame of the machine but is permitted slight rocking or backward and forward movement on the driving side by means of the roller bearing 44, Fig. 7, being arranged in the slot 45 of the frame. The stay bolts 47 and 48 firmly retain the upper and lower frame members 16 and 18 in close relationship to the slotted member 48. The opposite end of the shaft 39 is permitted a slight wobbling movement.

At the driving end of the shaft 39 there is rigidly held a gear wheel 49 so that when the yoke 46, which is arranged over the roller bearing 44, is moved forwardly (see Operation) the gears 49 and 27 will mesh. In order to control this movement there is pivotedly fastened to the yoke 46 an arm 50, its forward end being pivotedly attached intermediate the ends of an upright arm 51 as indicated at 52. At the upper end of the arm 51 may be arranged any conventional means, such as the rope 53 leading up to the front vehicle. The arm 51 is pivoted to the frame as indicated at 54.

The parts from the yoke 46 to and including the rope 53 are normally held in their rearward positions by means of the action of the spring 55, its forward end being attached to the pivot 52 and its rearward end to the clip 56, the clip being rigidly held on the lower frame member 18 and also acts as a guide for the rod 57.

The rod 57 is also attached to the yoke 46 and at its forward end is adjustably connected to a cross-shaft 58 having an opening therethrough for reception of an adjusting bolt 59 which will extend into the open end 60 of the rod 57 and be locked at the desired position by means of the double lock nuts 61, the forward end of the bolt 59 being locked securely by the nut 62. The shaft retaining member 63 is slotted, as shown at 64, thereby permitting forward movement of the shaft 58.

Loosely mounted on the shaft 58 are two sprocket wheels 65 and 66 over which the chains 42 and 43 play. The opposite end of the shaft 58 is journaled in a frame member 67 and may be held therein by means of the adjusting screw 68 which extends through the opening 69 at this end of the shaft and is held therein by the lock nuts 70. The forward end of the bolt 68 rests in the angle member 71 and is held therein by means of the nut 72. This adjustment is left sufficiently loose in order to permit of a slight wobbling movement thereof.

Connecting the two chains 42 and 43 are slats 73 of sufficient thickness, or angle irons, if preferable, which are arranged to rearwardly move the deposited straw and chaff and to discharge, from the rear of the machine, one bundle at a time.

The flooring may be of any preferred material such as the boards 74 and has the cross members 75 arranged thereunder for additional support.

Any suitable means, not shown, may be located under the flooring to maintain the chains 42 and 43 and slats 73 close to the flooring, thereby eliminating any undue sagging.

Referring particularly to Figs. 10 and 11, there is illustrated an automatic and adjustable means for varied and intermittent movement of the conveyor. It consists of a crank-arm 79 pivoted at 80 to the frame member 19, its lower crank 81 being actuated by a cam 82 and the cam being keyed or otherwise rigidly held to the shaft 21. The upper crank 83 of the crank arm is pivoted at 84 to the forward end of the pawl 85 and has its rearward end resting between two teeth of the ratchet wheel 86 which is rigidly mounted on the shaft 39.

A lock member 88, when actuated by a spring 89 will prevent reverse rotation of the ratchet wheel. Attached to the upper crank 83 is one end of a spring 90 while its other end is attached at 91 to the frame member 19. With this arrangement the spring 90 will return the crank to its normal position, after the same has been actuated. A set screw means 87, mounted on beam 17, limits the rocking movement of the crank 79 in response to the action of spring 90.

*Operation*

When the rope 53 is pulled forward this action likewise moves the arms 51 and 50 forward, likewise the yoke 46 and the last mentioned element will bear against the roller bearing 44 thereby forwardly moving the shaft 39, the slot 45 in the frame permitting of such movement, which continues until the gears 49 and 27 are meshed. As the rearward ends of the slots 30 and 31 are catching up with the studs 28 and 29 the gears will have ample time to completely mesh without any clashing thereof and when the rearward ends of the slots do catch up with the studs the parts will be in the positions illustrated in Fig. 2. At this point positive action will take place between the gears 27 and 49, thereby rotating the gear 49 in a counterclockwise direction which, in turn, rotates the shaft 39 and the sprocket wheels 40 and 41 thereon, thus moving the upper side of the conveyor rearwardly. When the rope 53 is released action of the spring 55 will return all parts to their inoperative positions.

Normally the forward movement of the shaft 39 would allow of slack in the chains 42 and 43 with danger of fouling said chains on the sprockets or otherwise, but, such slack is taken up by means of the forward movement of the rod 57 which also is attached to the yoke 46, such action pressing the forward shaft 58 an equal distance to the similar movement of the rearward shaft 39, thus maintaining the original distance between the sprocket wheels.

The operation of the parts illustrated in Figs. 10 and 11 can be briefly recited. At each revolution of the wheels 22 and 23 the cam 82 will bear down on the crank 81 thereby forcing the upper end rearward which will move the pawl 85 causing it to rotate the ratchet wheel and due to its being rigidly attached to the shaft 39 the same action will take place as that on the driving side, only to a lesser degree. The degree of rotation of the ratchet wheel 86 may be determined by means of the adjusting screw 87. The results of this portion of the mechanism are particularly desirable when the conveyor should be moved only a comparatively short distance.

Having thus described my invention, what I claim as new and desire to secure by Letters Patent is:

1. In a device of the class described, a gear wheel arranged to rotate with a traction wheel, a second gear wheel spaced away from and behind said rotating gear wheel, said second gear wheel being rigidly arranged on an end of a rotatable and rockable shaft, a means to rock said shaft to cause meshing action of said second gear wheel with said rotating gear wheel, said shaft having an endless conveyor trained thereover whereby rotation of said second gear wheel will move said conveyor, and a second shaft over which the conveyor is trained and connected to said means whereby complementary ends of the shafts will be rocked in unison.

2. In a device of the class described, a gear wheel arranged to rotate with a traction wheel, a second normally non-rotating gear wheel spaced away from said rotating gear wheel, said second gear wheel being rigidly mounted on a rockable shaft, endless conveyor means trained over said shaft, a bearing on one end of said shaft, a yoke over said bearing, a means to move said yoke whereby said shaft is rocked and said second gear wheel is moved into meshing engagement with said gear wheel to rotate the shaft and drive said endless conveyor, said yoke moving means consisting of a series of pivoted levers operated from a distant point and a rod having one end connected to said yoke, and a second shaft, said rod having its opposite end connected to said second shaft to move said shafts in unison when said yoke is moved, and said endless conveyor being trained over the second shaft.

3. In a device of the class described, a gear wheel arranged to rotate with a traction wheel, a second normally non-rotating gear wheel spaced away from said rotating gear wheel, said second gear wheel being rigidly mounted on a rockable shaft, endless conveyor means trained over said shaft, a bearing on one end of said shaft, a yoke over said bearing, a means to move said yoke whereby said shaft is rocked and said second gear wheel is moved into meshing engagement with said gear wheel to rotate the shaft and drive said endless conveyor, said yoke moving means consisting of a series of pivoted levers operated from a distant point and a rod having one end connected to said yoke, and a second shaft, said rod having its opposite end connected to said second shaft to move said shafts in unison when said yoke is moved, said second shaft having the endless conveyor loosely mounted thereon, and said rod maintaining both of said shafts in normal spaced relationship.

WILLIAM F. REISENWEBER.

REFERENCES CITED

The following references are of record in the file of this patent:

UNITED STATES PATENTS

| Number | Name | Date |
| --- | --- | --- |
| 700,723 | Behrman | May 27, 1902 |
| 803,227 | Hard | Oct. 13, 1905 |
| 908,207 | Crane | Dec. 29, 1908 |
| 932,461 | Garst | Aug. 21, 1909 |
| 1,018,984 | Parcels | Feb. 27, 1912 |
| 1,278,091 | Baseman | Sept. 10, 1918 |
| 2,297,894 | Joy | Oct. 6, 1942 |
| 2,340,983 | Pfeiffer et al. | Feb. 8, 1944 |
| 2,405,534 | Voth | Aug. 6, 1946 |